United States Patent
Luetkemueller et al.

(10) Patent No.: US 6,811,174 B2
(45) Date of Patent: Nov. 2, 2004

(54) SPORTS BICYCLE WITH CHANGEABLE HANDLEBARS

(75) Inventors: Harald Luetkemueller, Gifhorn (DE); Bernd Puerschel, Nuremberg (DE)

(73) Assignees: Evelyn Purschel, Nuremberg (DE); Hannelore Luetkemueller, Gifhorn (DE)

( * ) Notice: Subject to any disclaimer, the term of this patent is extended or adjusted under 35 U.S.C. 154(b) by 0 days.

(21) Appl. No.: 10/414,778

(22) Filed: Apr. 16, 2003

(65) Prior Publication Data

US 2004/0079184 A1 Apr. 29, 2004

(30) Foreign Application Priority Data

May 7, 2002 (DE) ........................................ 202 07 158

(51) Int. Cl.⁷ .............................................. B62K 21/16
(52) U.S. Cl. ...................... 280/274; 280/278; 74/551.5
(58) Field of Search ................................. 280/278, 270, 280/274, 279, 304.5, 281.1; 74/551.1, 551.3, 551.4, 551.5, 551.6, 551.7, 492, 493

(56) References Cited

U.S. PATENT DOCUMENTS

| | | | | |
|---|---|---|---|---|
| 561,329 A | * | 6/1896 | Leonard | 74/551.6 |
| 689,217 A | * | 12/1901 | Palmer | 74/551.3 |
| 5,121,652 A | * | 6/1992 | Morrone | 74/551.3 |
| 5,133,224 A | * | 7/1992 | Prins | 74/551.3 |
| 5,201,243 A | * | 4/1993 | Schneider | 74/551.1 |
| 5,269,550 A | * | 12/1993 | Hon et al. | 280/278 |
| 5,887,490 A | * | 3/1999 | Dittmar | 74/551.3 |
| 6,058,800 A | * | 5/2000 | Giard | 74/551.1 |
| 6,192,773 B1 | * | 2/2001 | Liao | 74/551.3 |
| 6,662,680 B2 | * | 12/2003 | Rocket | 74/551.3 |

FOREIGN PATENT DOCUMENTS

FR 2671323 * 7/1992 ........... B62K/21/22

* cited by examiner

*Primary Examiner*—Avraham Lerner
(74) *Attorney, Agent, or Firm*—Jordan and Hamburg LLP

(57) ABSTRACT

A sports bicycle, especially a training bicycle, with handlebars, especially triathlon handlebars, which can be slipped onto the front supporting tube of the frame, with a carrying tube, the height of which can be adjusted and fixed at different levels, and with handle legs which are directed towards the front and connected by a U-shaped bracket, with a reversing module with an intermediate carrying tube, which can be inserted into the supporting tube and to which a clamp mounting for the carrying tube of the handlebars is disposed transversely for achieving a steeply upwardly directed position of the handle legs, the clamp mounting preferably being constructed as a mounting sleeve.

6 Claims, 2 Drawing Sheets

SPORTS BICYCLE WITH CHANGEABLE HANDLEBARS

BACKGROUND OF THE INVENTION

Figure 1:
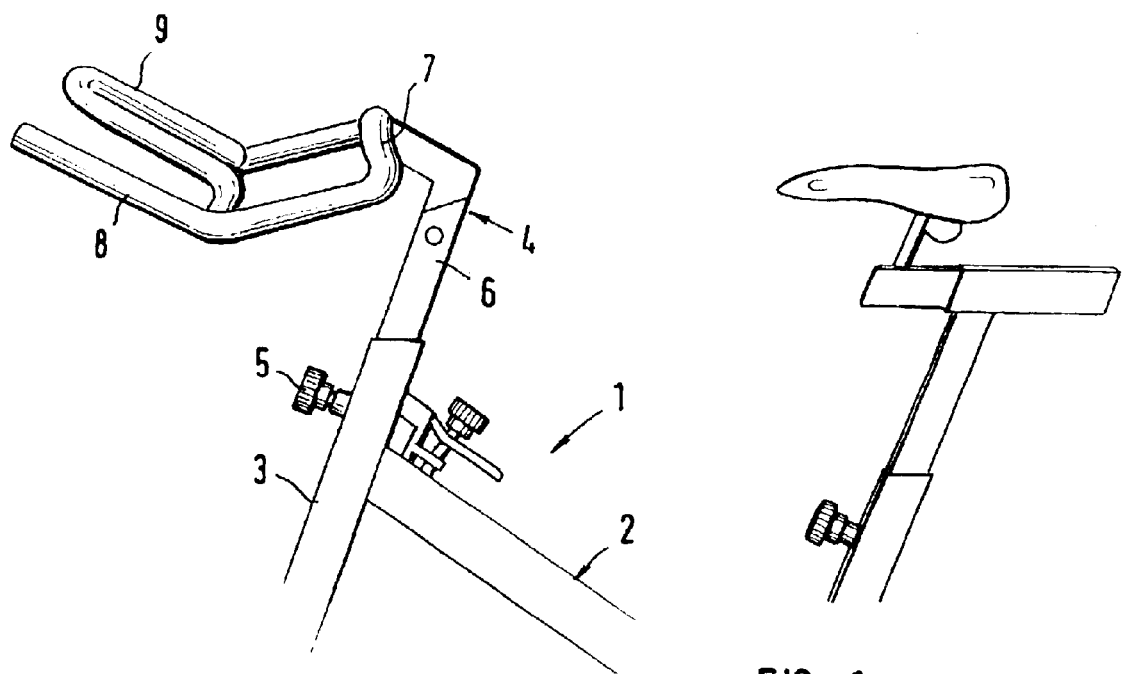

The invention relates to a sports bicycle, especially to a stationary, training bicycle, with handlebars, especially triathlon handlebars, which can be slipped onto the front supporting tube of the frame, with a supporting pipe, the height of which can be adjusted and fixed at different levels, and with handle legs, which are directed toward the front and connected by a U-shaped bracket.

Such sporting equipment, which is described, for example, in the utility patent 298 22 038.5, is designed by special triathlon handlebars for the possibility of supporting the forearms for the holding the body in an athletic position, in which the upper body of the user is inclined far towards the front in an almost horizontal position. Admittedly, this position makes possible an optimum pedaling posture and the maximum transfer of force. However, such sporting equipment, especially when it is to be operated, as stationary training equipment in fitness centers, should also be available as training equipment for persons, less trained athletically, especially also for older persons or persons with back problems. In this case, however, the athletic riding position generally is too much of a burden physically, so that the stationary training bicycles (indoor bicycles) generally cannot be used by this group of users for training purposes.

SUMMARY OF THE INVENTION

Is it therefore an object of the invention to design a sports bicycle of the type named above so that, by a simple resetting, a more comfortable, more upright operating position can be obtained.

For accomplishing this objective, the sports bicycle of the type above, is characterized, pursuant to the invention, by a reversing module with an intermediate carrying tube, which can be inserted into the supporting tube and on which, for achieving a steeply upwards directed position of the handle legs, a clamp mounting for the carrying tube of the handle bars is disposed transversely, the clamp mounting preferably being constructed as a mounting sleeve.

Due to the reversible module, which is constructed very simply pursuant to the invention and consists only of an intermediate carrying tube of the same shape as that of the carrying tube of the triathlon handlebars, which are always addressed in the following as the preferred example, and a mounting sleeve, which is transversely mounted thereon, for example, by welding, the desired resetting into a more comfortable bicycle position, especially for older athletes, can be carried out with one manipulation. The connection for the height adjustment for the triathlon handlebars is opened, the inventive module is inserted and the carrying tube of the triathlon handlebars is than inserted in the mounting sleeve of the reversing module, which is inclined slightly with respect to the horizontal.

In a development of the invention, this mounting sleeve of the reversing module should have a clamping, locking bolt for the preferred, continuously variable shifting of the intermediate carrying tube, so that, in this manner, the distance between the handlebars and the seat of the sports equipment can be adjusted individually.

IN THE DRAWINGS

Further advantages, distinguishing features and details of the invention arise out of the following description of an example as well as from the accompanying drawings.

Figure 2:
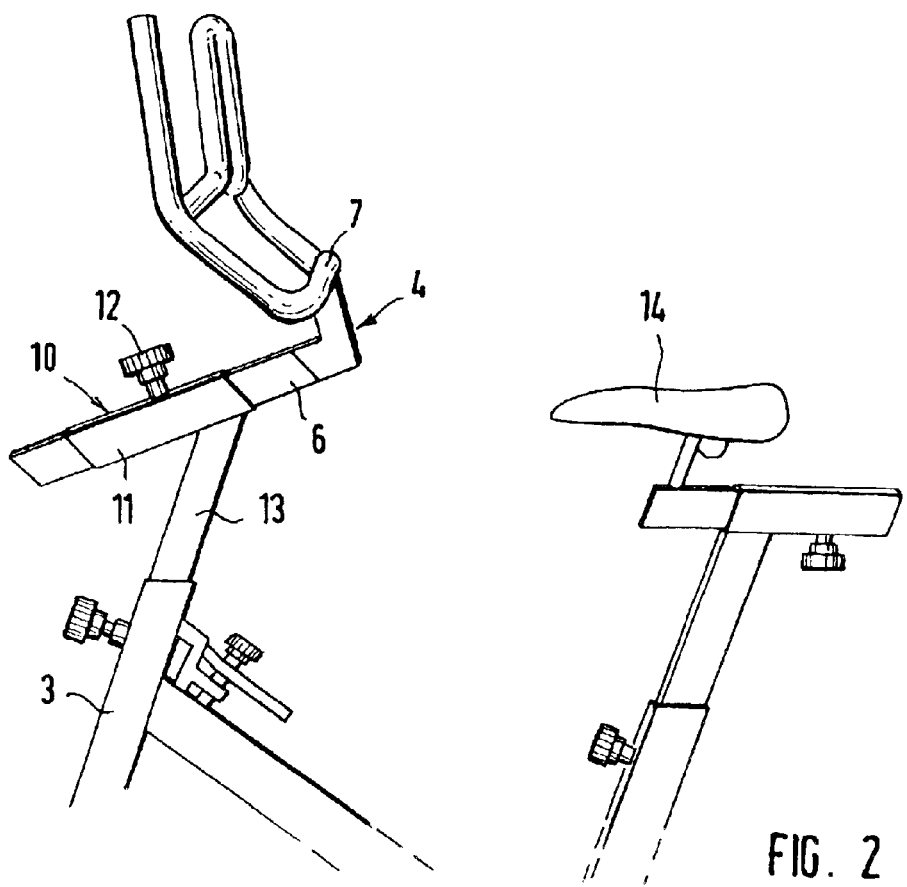
Figure 3:
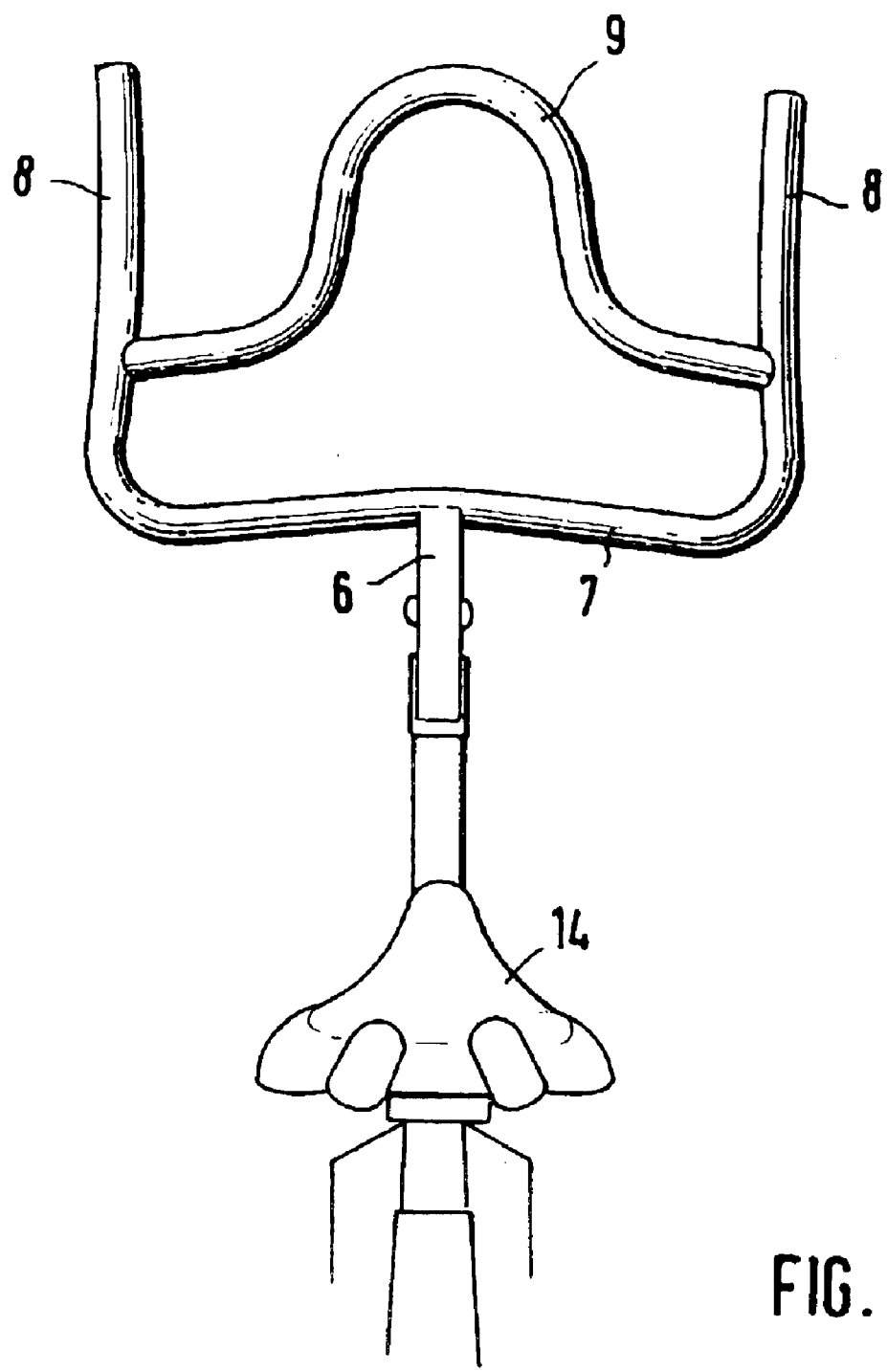

FIG. 1 shows a side view of the upper part of inventive, stationary bicycle in the racing position of the handlebars, FIG. 2 shows a side view, for which a reversing module permits the body to be maintained in an upright position while riding the bicycle and FIG. 3 shows a view of the upper part of the sports bicycle from the rear.

The inventive sports equipment 1, shown in the Figures, consists of a frame 2, at which a freewheeling is held rotatably and which can be driven over a pedal drive, the detailers of which are not described and which can be constructed as direct drive without freewheeling. The sports bicycle, moreover, may include a braking device, the details of which need not be described here, since they are not a subject matter of the present invention. Triathlon handlebars 4 can be slipped onto the front supporting tube 3 of the frame 2. The triathlon handlebars 4 consist of a carrying tube 6, the height of which can be adjusted with the help of a locking bolt 5 and which, at both ends, carries forward directed handle legs 8, which are connected by a U-shaped bracket 9, which forms the gripping position when the forearms of the rider are resting on the handle legs (triathlon handlebars). In about the center, the handlebars 8 are bent slightly in the upward position. This construction of the triathlon handlebars for a training bicycle is known.

DESCRIPTION OF THE PREFERRED EMBODIMENTS

Pursuant to the invention, a reversing module 10, as installed in FIG. 2, is provided in order to make an upward riding position possible, especially for older athletes. This reversing module 10 consists of a mounting sleeve 11 with a locking bolt 12 for mounting the carrying tube 6 of the triathlon handlebars 4, as well as an intermediate carrying tube 13, to which the mounting sleeve advisably is welded in a transverse position in such a manner that, when the carrying tube 6 is inserted, the handle legs of the handlebars assume a steeply upward directed position, as can be seen in FIG. 2. This enables the rider to sit in an essentially upward position in contrast to the sporting position of sitting, which the setting of the handlebars of FIG. 1 requires.

For reversing from the sports riding position of FIG. 1 into the more convenient hobby athlete position of FIG. 2, the locking bolt 5 is loosened, the handlebars 4 are pulled out of the front supporting tube 3 and, after the reversing module 10 is inserted and fixed, the handlebars with the carrying tube 6 are once again inserted in the mounting sleeve 11 of the reversing module 10 and fixed by means of the locking bolt 12 in the position, which is at the desired distance from the seat 14.

The invention is not limited to the example shown. For example, it is not absolutely essential that the handlebars 4 are triathlon handlebars. Instead, they can also be a different type of handlebars for a sports bike, for which, through the use of an inventive reversing module, a change in the position of the handle legs 8 from a more athletic riding position into a more comfortable upright riding position, is possible.

What is claimed is:

1. In a sports bicycle having a frame with a, front supporting tube, the combination comprising handlebars having a carrying tube, the height of which can be adjusted and fixed at different levels in the front supporting tube, handle legs directed towards the front and connected by a U-shaped bracket, a reversing module (10) with an intermediate supporting tube (13) which can be inserted in the supporting tube (3) and to which a clamp mounting for the carrying tube (6) of the handlebars (4) is disposed transversely for achieving a steeply upwardly directed position of the handle legs (8).

2. In the sports bicycle of claim 1, wherein the clamp mounting is a mounting sleeve (11).

3. In the sports bicycle of claim 2, wherein the clamp mounting (11) has a clamping locking bolt (12).

4. In the sports bicycle of claim 1, wherein the sports bicycle is a training bicycle.

5. In the sports bicycle of claim 1, wherein the handlebars are triathalon handlebars.

6. In the sports bicycle of claim 3, wherein the clamping locking bolt (12) provides for infinitely variable displacement of the carrying tube (6) of the handlebars (4).

* * * * *